(12) United States Patent
Palmer et al.

(10) Patent No.: US 12,126,227 B2
(45) Date of Patent: Oct. 22, 2024

(54) WIND GENERATOR ROTOR CONNECTION REPLACEMENT

(71) Applicant: Electromechanical Engineering Associates, Inc., Monroeville, PA (US)

(72) Inventors: Corey Allen Palmer, Greensburg, PA (US); Lauren Theresa Haley, Pittsburgh, PA (US); Christopher J. Mascaro, Gibsonia, PA (US); Thomas J. Schildkamp, Greensburg, PA (US); Jason Sinkhorn, Monroeville, PA (US)

(73) Assignee: Electromechanical Engineering Associates, Inc., Monroeville, PA (US)

( * ) Notice: Subject to any disclaimer, the term of this patent is extended or adjusted under 35 U.S.C. 154(b) by 134 days.

(21) Appl. No.: 17/683,231

(22) Filed: Feb. 28, 2022

(65) Prior Publication Data

US 2022/0278595 A1 Sep. 1, 2022

Related U.S. Application Data

(60) Provisional application No. 63/286,526, filed on Dec. 6, 2021, provisional application No. 63/154,396, filed on Feb. 26, 2021, provisional application No. 63/153,981, filed on Feb. 26, 2021, provisional application No. 63/154,178, filed on Feb. 26, 2021.

(51) Int. Cl.
| | |
|---|---|
| *H02K 1/24* | (2006.01) |
| *H02K 3/28* | (2006.01) |
| *H02K 3/50* | (2006.01) |
| *H02K 15/00* | (2006.01) |

(52) U.S. Cl.
CPC .......... *H02K 15/0006* (2013.01); *H02K 1/24* (2013.01); *H02K 3/28* (2013.01); *H02K 3/50* (2013.01); *H02K 2203/06* (2013.01); *H02K 2203/09* (2013.01)

(58) Field of Classification Search
CPC .. H02K 3/51; H02K 15/0062; H02K 15/0006; H02K 3/28; H02K 3/50; H02K 1/24; H02K 1/26; H02K 13/02; H02K 19/38; H01R 13/187
See application file for complete search history.

(56) References Cited

U.S. PATENT DOCUMENTS

| | | |
|---|---|---|
| 4,870,308 A | 9/1989 | Sismour, Jr. |
| 6,280,265 B1 | 8/2001 | Hopeck et al. |
| (Continued) | | |

OTHER PUBLICATIONS

International Search Report and Written Opinion dated May 17, 2022 for corresponding PCT Application No. PCT/US2022/018196.

(Continued)

*Primary Examiner* — Leda T Pham
(74) *Attorney, Agent, or Firm* — Eckert Seamans Cherin & Mellott LLC; Lisa E. Geary

(57) ABSTRACT

Devices, systems, and methods for repair and upgrade of the connection between a winding and a wye ring of a rotating electric machine. The system generally includes a flexible connector having an elongated curved central region. A first end of the flexible connector may be connected to the winding by brazing and a second end of the flexible connector may be connected to the wye ring as a brazed puzzle or dovetail joint. The system may further include a wye ring assembly specifically configured to provide attachment for the flexible connectors.

21 Claims, 19 Drawing Sheets

(56) References Cited

U.S. PATENT DOCUMENTS

| | | | |
|---|---|---|---|
| 7,002,270 B2 | 2/2006 | Zhang et al. | |
| 9,225,217 B2 * | 12/2015 | Tomita | H02K 3/50 |
| 10,177,621 B2 * | 1/2019 | Kunihiro | H02K 19/26 |
| 2003/0201688 A1 * | 10/2003 | Yamamura | H02K 3/522 |
| | | | 310/71 |
| 2013/0049501 A1 | 2/2013 | Fujisaki | |
| 2013/0181569 A1 | 7/2013 | Nakagawa et al. | |
| 2013/0328425 A1 * | 12/2013 | Tomita | H02K 3/52 |
| | | | 310/71 |
| 2015/0059163 A1 * | 3/2015 | Neumann | H02K 15/0006 |
| | | | 29/596 |
| 2018/0055529 A1 * | 3/2018 | Messerly | H10N 30/886 |
| 2018/0205297 A1 | 7/2018 | Toledo et al. | |
| 2019/0006905 A1 | 1/2019 | Lindwurm et al. | |

OTHER PUBLICATIONS

International Search Report and Written Opinion dated May 18, 2022 for corresponding PCT Application No. PCT/US2022/018216.

* cited by examiner

WIND GENERATOR ROTOR CONNECTION REPLACEMENT

CROSS REFERENCE TO RELATED APPLICATIONS

The present application claims priority to U.S. Provisional Patent Application Ser. Nos. 63/154,178, 63/153,981, and 63/154,396, all filed Feb. 26, 2021, and U.S. Provisional Patent Application Ser. No. 63/286,526, filed Dec. 6, 2021, each of which is incorporated herein in its entirety.

FIELD OF INVENTION

This disclosure generally relates to devices, systems, and methods for replacement and upgrade of a generator rotor phase and neutral ring connection.

BACKGROUND

The use of wind turbines to capture wind power is growing at a fast pace worldwide. The Doubly-Fed Induction Generator (DFIG) is widely adopted in wind turbines because of its variable speed operational capability, low operating noise, mechanical stress mitigation, and control flexibility for active and reactive power.

The DFIG consists of a three-phase wound rotor and a three-phase wound stator. The rotor is fed with a three-phase AC signal that induces an AC current in the rotor windings. As the wind turbines rotate, they exert mechanical force on the rotor causing it to rotate. As the rotor rotates, the magnetic field produced due to the AC current also rotates at a speed proportional to the frequency of the AC signal applied to the rotor windings. As a result, a constantly rotating magnetic flux passes through the stator windings causing induction of an AC current in the stator winding. Thus, the speed of rotation of the stator magnetic field depends on the rotor speed as well as the frequency of the AC current fed to the rotor windings.

Many types of DFIG rotor connection schemes exist and are produced by a variety of manufacturers. The rotor connection scheme, colloquially called "wye rings", is the electrical connection for the three-phase winding housed by the rotor. The rotor is connected in a wye configuration; hence the term wye rings. The wye rings themselves consist of connections for each of the three phases, a neutral ring, and in most designs, one or more parallel jumpers between connections of the same phase.

Original manufacturer DFIG rotor connection schemes have a plurality of failure modes. Some of the failure modes are a result of improper design and/or strength of the components. In most cases, however, the failures are a result of rigid mechanical coupling between the outside diameter (OD) and the inside diameter (ID) of the rotor components.

Each manufacturer constructs their rotor in a similar manner: a central steel shaft (12 of FIGS. 1A-1C); laminations fit to the steel shaft that contain slots for a rotor winding (20); coils that comprise the rotor winding housed in the lamination slots, wherein the coils extend beyond the laminations to be electrically connected via rigid copper jumpers (phase and neutral, 16, 16A, 16B) to one another and to wye rings (14, glass support ring 18 is also shown), and to coil cables (24); and banding (a composite material, typically a polyester but sometimes carbon fiber, 22) applied to the top of the coils to restrain the coils against centrifugal forces.

The banding is a semi-rigid material and dilates with centrifugal forces a small but measurable amount. The coils, which are supported by the banding, will dilate with the banding. Other components, such as the wye ring, dilate significantly less than the banding. Components connected between the wye ring and the coils, such as the copper jumpers shown in FIG. 1A, are strained by this differential dilation. These strains are typically a combination of elastic and plastic strains, and these generators are typically subject to cyclic duty due to varying wind conditions. Varying wind equates to varying speed, varying speed equates to varying dilation of the components, varying dilation of the components equates to varying strain and varying strain equates to fatigue of the components.

Fatigue is a metallurgical phenomenon by which a material subject to cyclic (and varying in this case) strains will eventually fracture. These fractured components are also current carrying as they are the parallel, neutral, and phase connections in the rotor winding. Thus, once fractured, the components may fail in a variety of ways but typically fail either mechanically, where the fracture progresses through the thickness of the part creating a complete loss of structural integrity, or electrically, where the initial fracture serves as an initiation site for electrical arcing. The arcing damages electrical insulation protecting the fractured, or adjacent, components which in turn creates a larger electrical failure.

Accordingly, methods that may eliminate the sources of these failures would be desirable. Further, devices and systems that may replace and upgrade existing generator rotor phase and neutral ring connections and/or wye ring assemblies would be desirable. Finally, devices, systems, and methods that may be applicable to DFIGs from any manufacturer would be desirable.

BRIEF SUMMARY

The present disclosure relates to a system for connection between a winding and a wye ring of a rotating electric machine, wherein the wye ring is spaced apart from a central rotor shaft of the rotating electric machine and the winding is spaced apart from the wye ring. The system generally comprises a flexible connector having an elongated curved central section with an enlarged radius to increase radial flexibility and distribute strain over a greater area. The flexible connector has a longitudinal extent delimited by a first end portion and a second end portion, wherein the first end portion is connected to the winding and the second end portion is connected to the wye ring via a puzzle, dovetail or lap joint. According to some aspects, the puzzle, dovetail or lap joint is brazed or connected via a nut and bolt attachment. The first end portion of the flexible connector may be connected to the winding via a coil post of the winding wherein the connection is a brazed connection or a nut and bolt attachment. The flexible connector is designed and configured to absorb differential strains between the winding and the wye ring when the central rotor shaft rotates.

The system may comprise a plurality of flexible connector for each of a plurality of rings. According to aspects of the present disclosure, the plurality of rings may comprise three phase rings and one neutral ring. The system may further comprise a main lead connector having a first end connected to the wye ring and a second end that extends radially inward toward the central rotor shaft and is configured for attachment of main leads that extend from the central rotor shaft. The system may comprise three main lead connectors, wherein each main lead connector is connected to one of the three phase rings. According to aspects, the main lead connector may be connected to the wye ring via nut and bolt attachments.

The flexible connector generally comprises an elongated curved central section between the first and second end portions. According to aspects, the elongated curved central section may be in a shape resembling a question mark or a sickle. According to aspects, the flexible connector may be made from the same material as the wye ring, including but not limited to copper.

The system further comprises a wye ring having an open central region configured to surround the central rotor shaft of the rotating electric machine. The wye ring generally comprises a mounting ring, a neutral ring, and three phase rings layered axially with an insulation ring between each of the rings. Each phase ring comprises one of the three main lead connectors on an inner diameter thereof. According to aspects, each one of the three main lead connectors may be affixed to each one of the three phase rings by a nut and bolt attachment. According to aspects, each of the three main lead connectors are spaced approximately equidistantly around the wye ring, such as spaced every 120 degrees when the phase rings are axially layered in an assembled wye ring.

Each of the three phase rings comprises three equidistant cutouts every 120 degrees along an outer diameter, each cutout configured to accept one of three flexible connectors, such as flexible lead connectors. The flexible lead connectors may be affixed to the phase rings by a puzzle, dovetail, or lap joint at the cutouts. According to aspects, the puzzle, dovetail, or lap joints are brazed or connected via a nut and bolt attachment. In a preferred embodiment, the joints are brazed dovetail joints. Each phase ring also comprises three equidistant cutouts every 120 degrees, each cutout configured to accept one of three phase jumper connectors. According to aspects, a phase jumper is positioned 80 degrees from a lead connector on the phase ring. According to aspects, when the wye ring is assembled with the phase rings axially layered, the lead connectors are equidistantly spaced every 40 degrees, with each lead connector aligned with a phase jumper of another ring.

The neutral ring comprises nine equally spaced cutouts every 40 degrees along an outer diameter, each cutout configured to accept one of nine neutral connectors. The neutral connectors are affixed to the neutral ring by a puzzle, dovetail, or lap joint at the cutouts. According to aspects, the puzzle, dovetail, or lap joints are brazed or connected via a nut and bolt attachment. The neutral connectors may also comprise an elongated bend, forming a question mark or sickle shape to better tolerate strains and displacement. The neutral connectors comprise a first end portion extending radially from the neutral ring connected to a winding via an attachment lug and a second end portion attached to the neutral ring. According to aspects, the neutral connectors may comprise a second attachment to the winding at a midpoint on the connector. According to aspects, when the wye ring is assembled and the rings are axially layered, each neutral ring is positioned at a radial midpoint between every two connector leads at a radial distance of 20 degrees from each of the two adjacent connector leads.

When assembled, the three phase rings and the neutral ring are layered axially atop the mounting ring, with a ring made of electrically insulating material between each ring and the mounting ring. The mounting ring is configured to be structurally attached to a rotor shaft. In some versions, the mounting ring maybe shrunk fit or bolted onto the rotor shaft of the rotating electrical machine or may be bolted to a structure of the rotor.

The system may further comprise a mounting ring attachable to a bottom surface of the phase ring, wherein the mounting ring is configured to be shrunk fit onto the rotor shaft of the rotating electric machine. In some versions, the mounting ring may be bolted to a spider structure of the rotor.

DESCRIPTION OF THE DRAWINGS

The present invention is described in detail below with reference to the accompanying drawings. Where several embodiments are disclosed, similar components having similar functions may be denoted by an identical reference number. The embodiments below describe an alternating-current excitation synchronous rotating electric machine (i.e., doubly-fed induction generator) as an example but are applicable to any winding type rotating electric machine. The description below is merely exemplary of particular possible embodiments and is not intended to limit an aspect of the present invention to the specific aspects described below.

FIG. 5A depicts a front perspective view of a prior art lead connector while

DETAILED DESCRIPTION

Figure 1A:
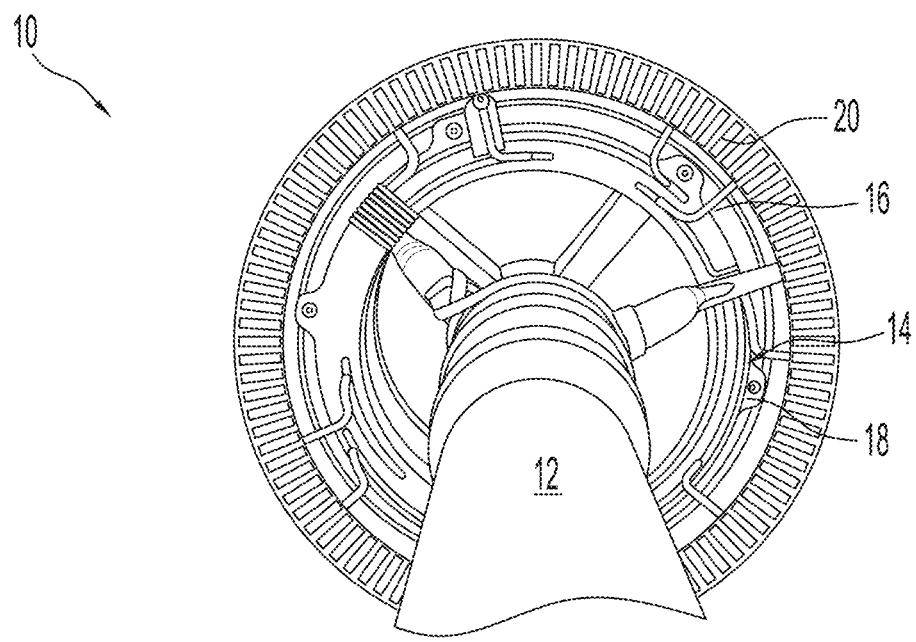
FIGS. 1A-1C illustrate prior art components of a doubly-fed induction generator (DFIG).
Figure 1B:
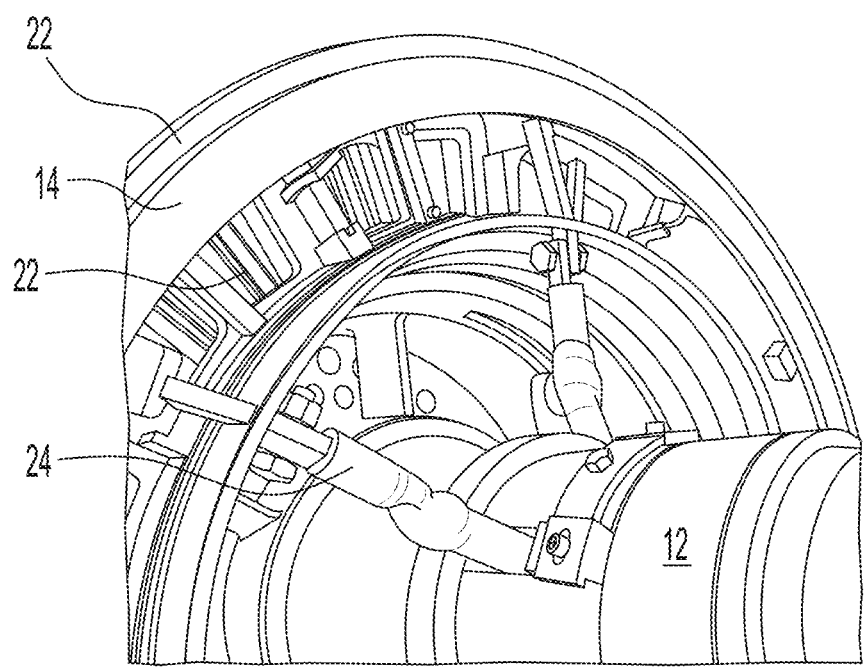

In the following description, the present invention is set forth in the context of various alternative embodiments and implementations involving systems and methods to ameliorate failures in prior art connection schemes for rotating electric machines, such as mechanical and/or electrical failures in doubly-fed induction generators caused by differential expansion of components under centrifugal forces, improper design and/or strength of the components, and the like.

Before describing the devices, systems, and methods of the present invention in detail, the following definitions and abbreviations are provided to aid in a better understanding of the scope of the present disclosure.

Definitions and Abbreviations

Various aspects of the systems, devices, and methods disclosed herein may be illustrated with reference to one or more exemplary implementations. As used herein, the term "exemplary" means "serving as an example, instance, or illustration," and should not necessarily be construed as preferred or advantageous over other variations of the systems, devices, and methods disclosed herein. "Optional" or "optionally" means that the subsequently described component, event, or circumstance may or may not be included or occur, and the description encompasses instances where the component or event is included and instances where it is not.

Furthermore, throughout the specification, reference to "one embodiment," "an embodiment," or "some embodiments" means that a particular described feature, structure, or characteristic is included in at least one embodiment. Thus, appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the various parts of the systems and devices disclosed herein may be used unless otherwise indicated.

It must also be noted that as used herein and in the appended claims, the singular forms "a", "an", and "the" include the plural reference unless the context clearly dictates otherwise. Unless defined otherwise, all technical and scientific terms used herein have the same meanings as commonly understood by one of ordinary skill in the art.

All numerical quantities stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the terms "include", "includes", and "including" are meant to be non-limiting. As generally used herein, the terms "have", "has", and "having" are meant to be non-limiting.

Various aspects of the systems, devices, and methods disclosed herein may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

ASPECTS OF THE DISCLOSURE

The presently disclosed devices, systems, and methods repair and/or upgrade components of a rotating electric machine that typically lead to mechanical and electrical failures. The inventive devices and systems may replace the original manufacturer's connection components, i.e., jumpers and leads, and/or wye ring assembly with retrofit components or an entire retrofit assembly that is applicable to any manufacturer of doubly fed induction generators (DFIG).

Prior art connectors are not only rigid but are generally made from a same one piece of metal as the rings. Each prior art ring and associated connectors are therefore a single piece of rigid metal without flexibility between the ring and the connectors or in the connectors themselves. As such, these previous jumpers and leads did not adequately account for dilation of the banding and thermal expansion of the winding, particularly thermal expansion in the axial direction, which is identified as a source of strain. In particular, since the winding generally has a weight larger than that of the neutral and phase rings and is positioned on an outermost side of the rotor, the winding experiences a large centrifugal force that causes deformation and/or displacement of the winding outward in the radial direction while the neutral and phase rings experience a lesser centrifugal force and smaller deformation/displacement forces. Thus, in the prior art systems, the rigid connectors between the winding and the phase and neutral rings, and the rigid attachments for those connectors, experienced fatigue breakdown.

Figure 1C:
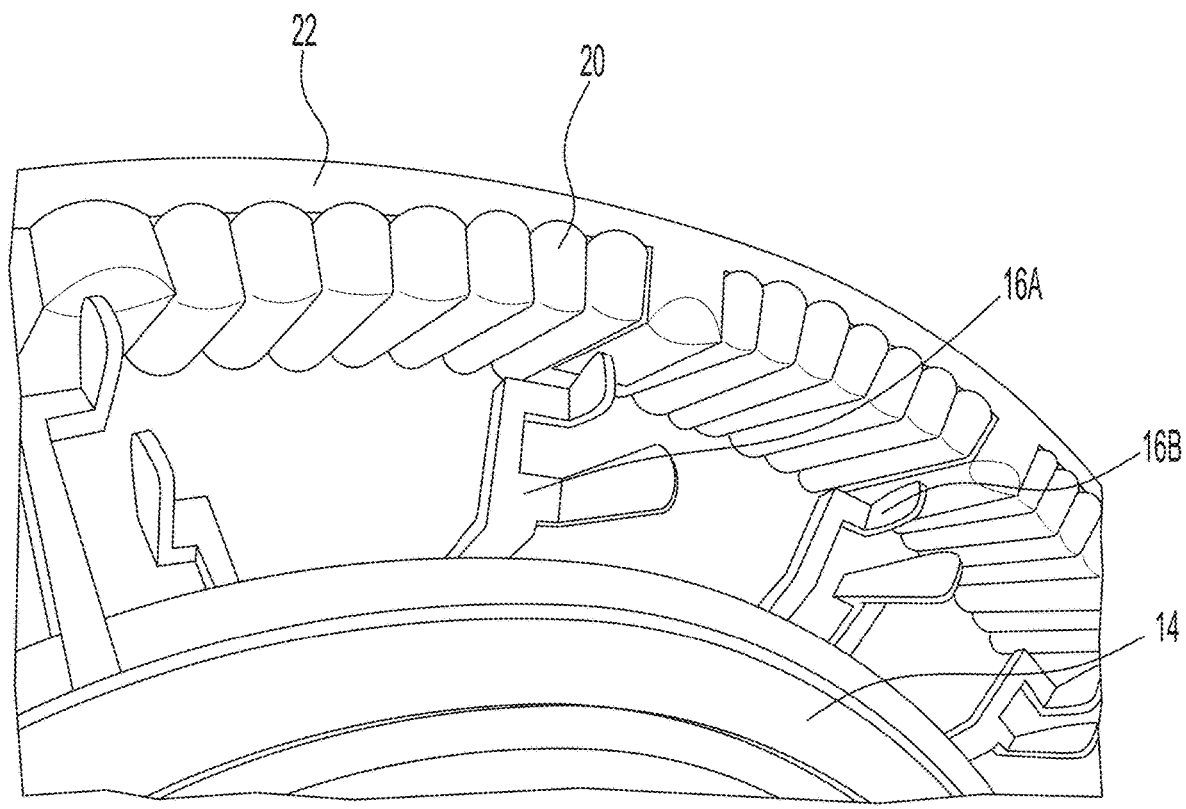

The present inventors conducted a root cause analysis to determine how and where the jumpers, leads, and wye ring on a standard DFIG would fail. Using results from this analysis, the inventors designed new connectors that properly account for the above indicated displacements by distributing strains across a larger area, and a wye ring integration of the connectors that significantly improves upon the original design by reducing the discovered failure mechanisms. The original wye ring design can be partially seen in FIG. 1C and a new wye ring design can be seen in FIG. 2 in combination with FIGS. 3A-3B. Moreover, the new connectors and wye ring designs were evaluated using traditional calculations and mathematical model analyses to determine their acceptability and were found to provide a service life at least 50% longer than prior art designs, showing durability over tens of thousands of starts (see Examples for experimental results).

Design Concept—Flexible Jumpers and Leads

Figure 2:
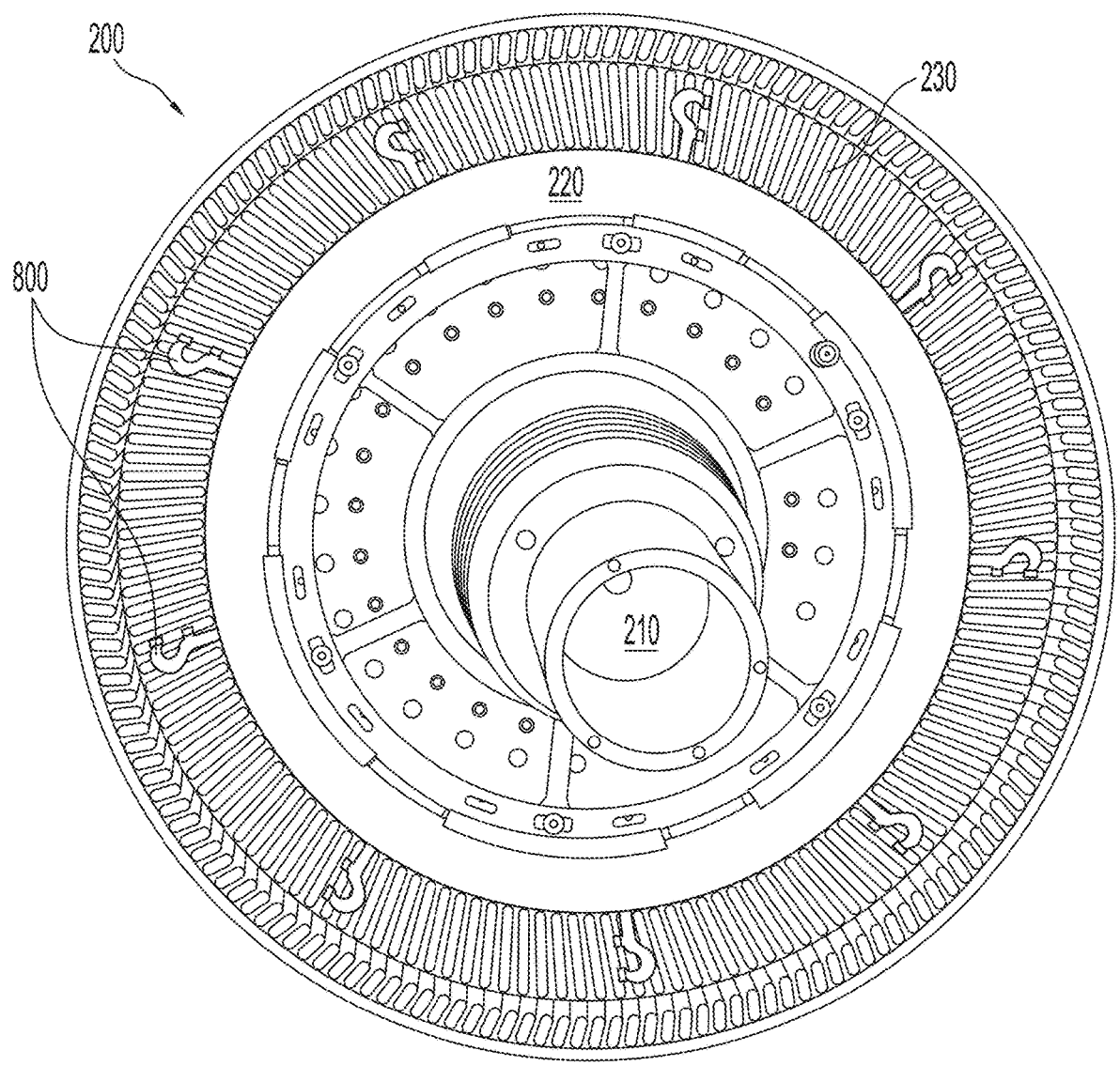
FIG. 2 illustrates components according to aspects of the present disclosure for retrofitting a DFIG.
Figure 3A:
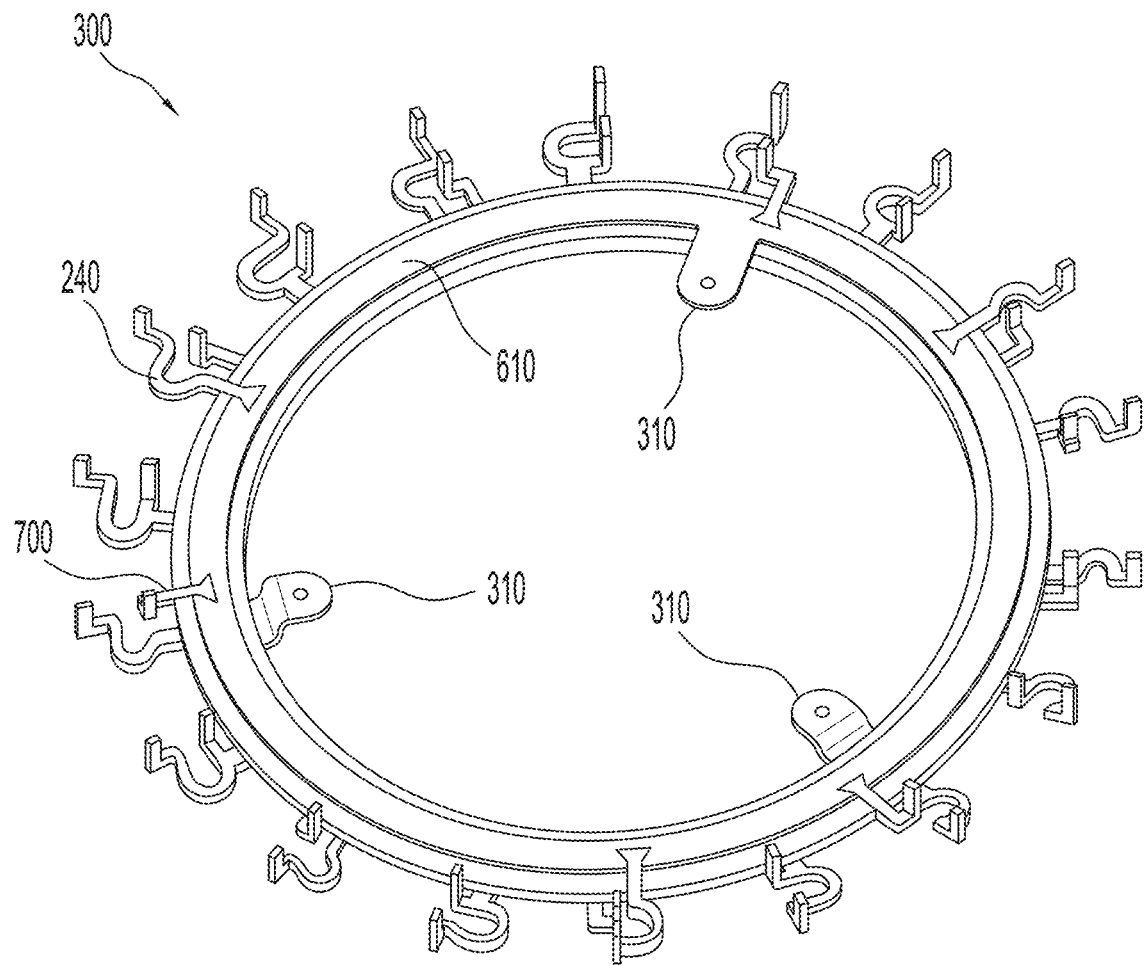
FIG. 3A illustrates a front perspective view of a wye ring with flexible connectors and jumpers according to certain aspects of the present disclosure.
Figure 3B:
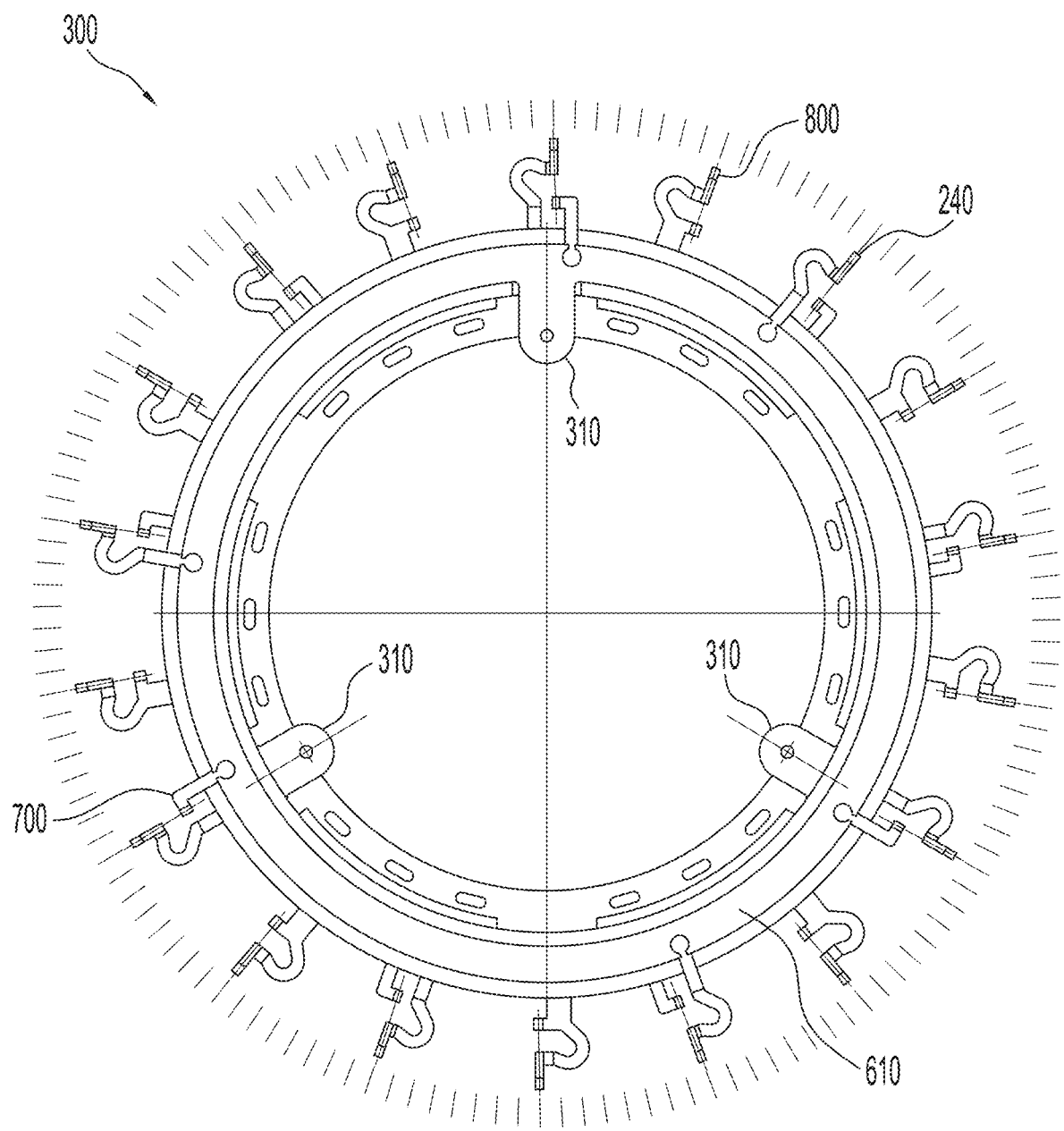
FIG. 3B illustrates a front view of a wye ring with flexible connectors and jumpers according to certain aspects of the present disclosure.

A system according to the present invention is illustrated in FIG. 2 in combination with FIGS. 3A-3B. FIG. 2 depicts a partially assembled rotating electric machine 200. As shown, the rotating electric machine 200 generally includes a central rotor shaft 210 that supports three main leads (not pictured) therethrough, each of the main leads, or sets of main leads, being connected to a phase ring of a wye ring 300 at each main lead connector 310 pictured in FIGS. 3A-3B. Spaced apart from the central rotor shaft 210 is the wye ring 300. The partially assembled rotating electric machine 200 pictured in FIG. 2 depicts only a neutral ring 220 of the wye ring 300. Spaced apart from the wye ring 300 are field windings 230.

Figure 4A:
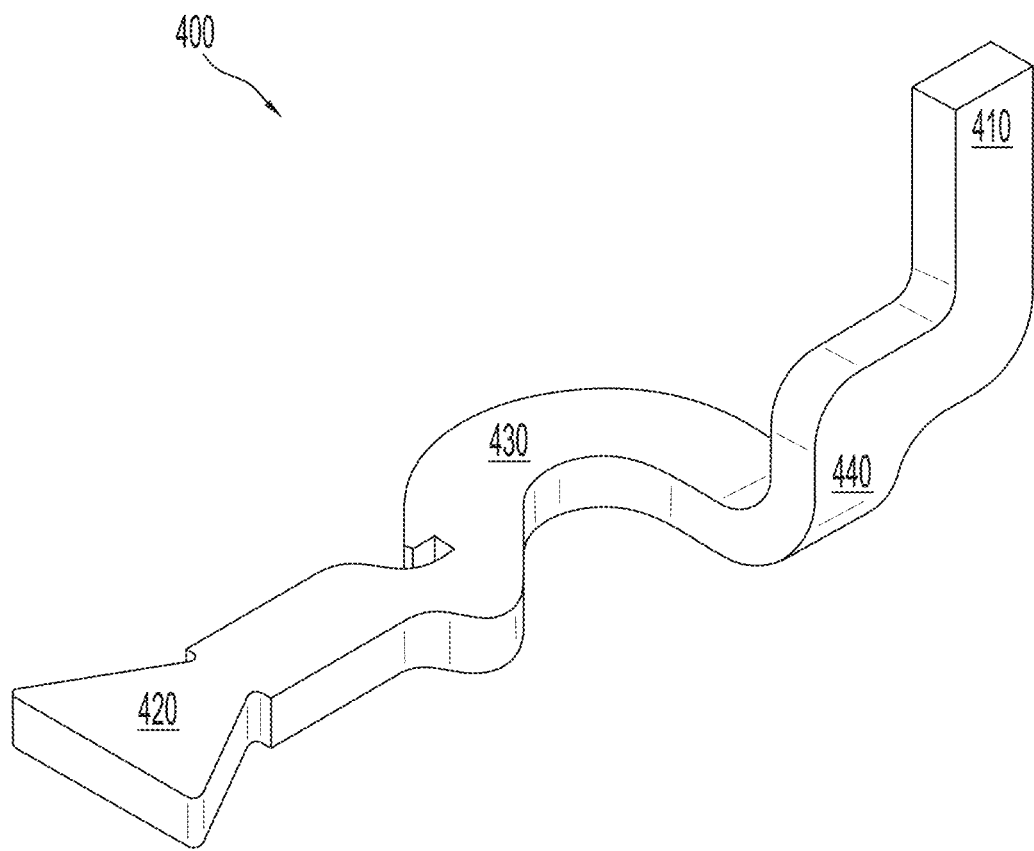
FIG. 4A illustrates a front perspective view of a flexible connector according to certain aspects of the present disclosure.
Figure 4B:
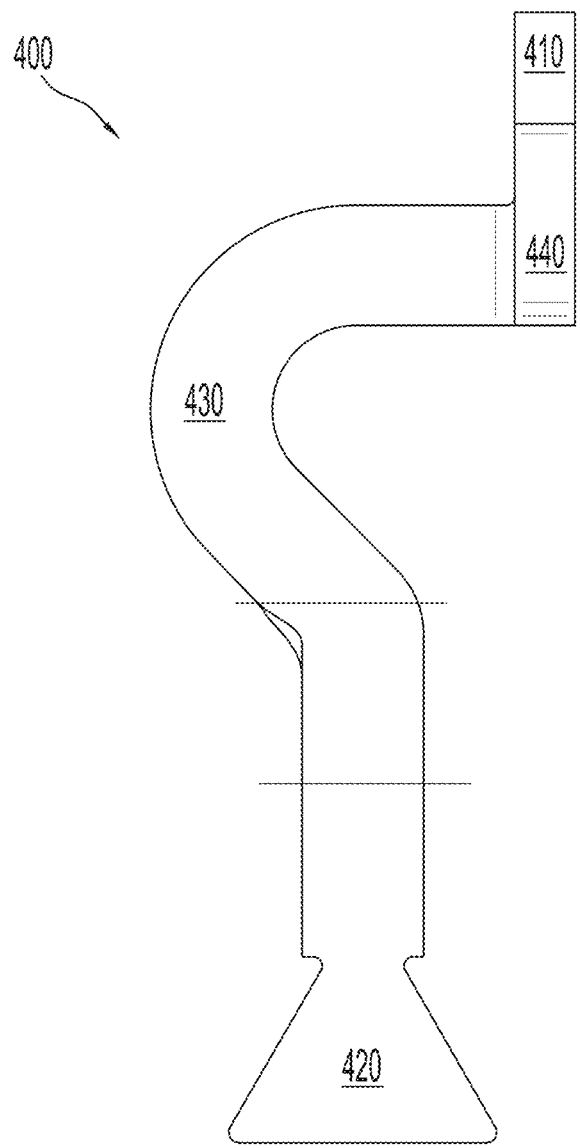
FIG. 4B illustrates a front view of the flexible connector shown in FIG. 4A.
Figure 4C:
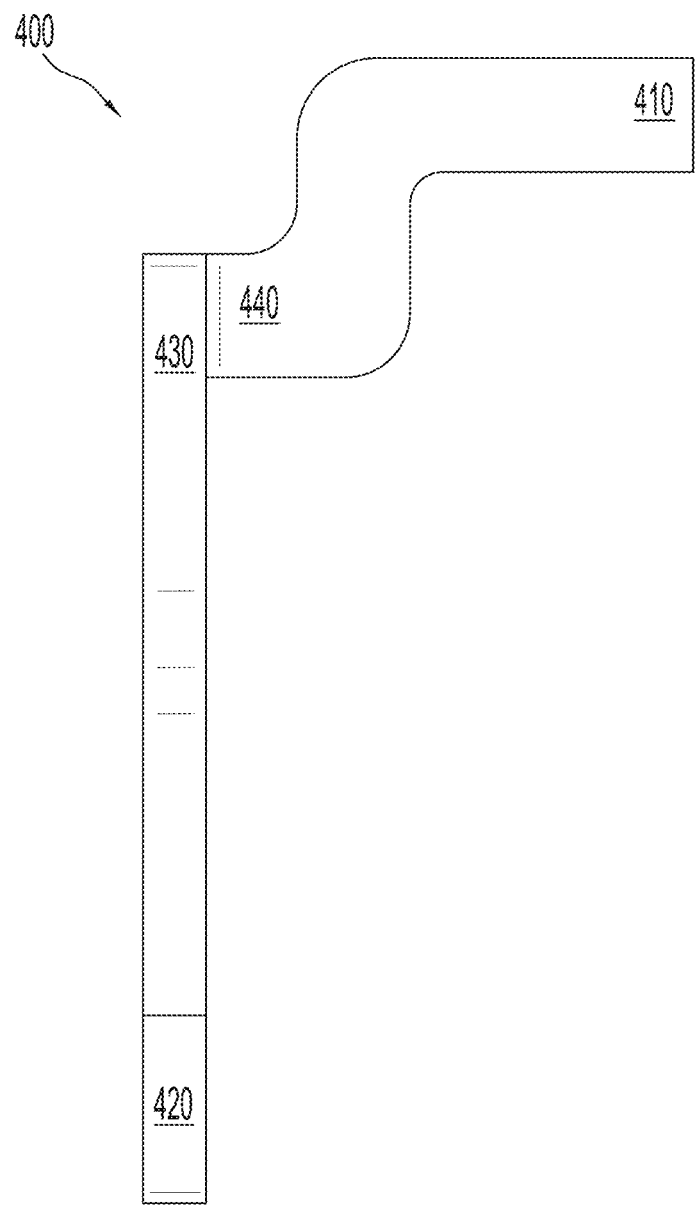
FIG. 4C illustrates a side view of the flexible connector shown in FIG. 4A.
Figure 4D:
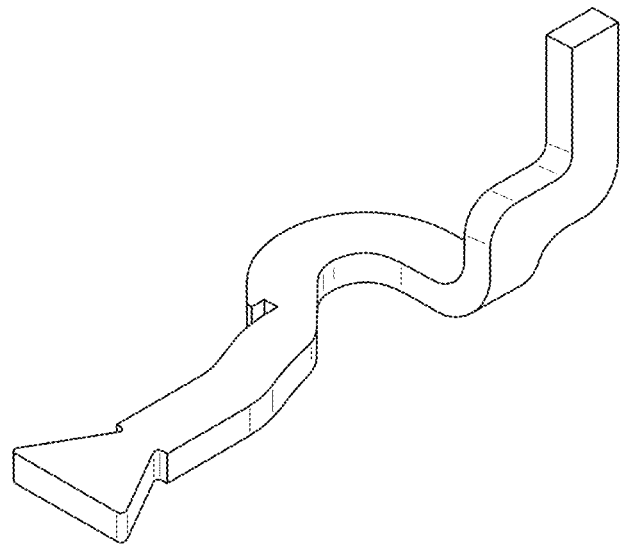
FIGS. 4D and 4E illustrate front perspective views of additional flexible connectors according to certain aspects of the present disclosure.
Figure 4E:
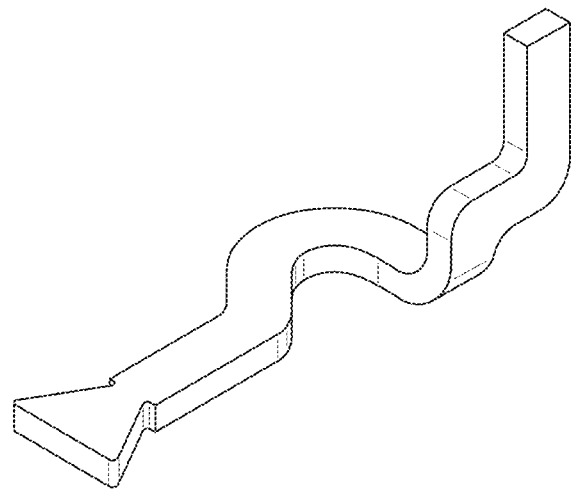

The system provides connection between the field winding 230 and the wye ring 300 of the rotating electric machine 200 via flexible lead connectors 240 pictured in FIG. 3A or flexible neutral connectors 800 pictured in FIG. 2 that will successfully support and allow for dilation of the winding/banding. With reference to FIGS. 4A-4C, the flexible lead connectors 240 comprise an electrically conductive metal bar 400 having a longitudinal extent delimited by a first end 410 and a second end 420. According to aspects, the metal bar 400 is made of copper. The metal bar 400 also has a central region 430, which is elongated and curved to form a question mark or sickle shape with an enlarged radius, although other shapes may also be used, especially if the shape adds length to the bar and radius to one or more curves in the bar. In general, increasing the radius of a curve in the metal bar 400 and/or increasing the overall length of the metal bar 400 better distributes strain across the flexible lead connector 240 such that it increases its flexibility and longevity. According to aspects, the flexible lead connector 240 may have one or more additional curves 440 to properly align the first end 410 with the field windings 230 or attachment lug to which the first end 410 is attached.

The first end 410 of the flexible lead connector 240 is configured to be attached and electrically coupled to a first end of the field windings 230. According to aspects, the first end 410 is affixed to the field windings 230 or to an attachment lug connected to the field windings 230. According to some aspects, the first end 410 and the field windings 230 or the attachment lug are affixed by brazing or via a nut and bolt attachment. The second end 420 is configured to attach to the wye ring 300. The second end 420 of the flexible lead connector 240 is connected to the wye ring 300 by a dovetail, puzzle or lap joint. Therefore, the second end 420 comprises a shape to properly fit in a cutout of the same shape and size along the outer perimeter of the wye ring 300 to form a joint connection. According to aspects, the connection between the second end 420 and the wye ring 300 is brazed or connected via a nut and bolt attachment. According to preferred aspects, the connection is formed by a brazed dovetail joint.

The flexible lead connector 240 is designed to flex during operation as a result of centrifugal dilation of the winding/banding. Moreover, the unique shape of the flexible lead connector 240 limits stress and strain to acceptable levels to achieve the desired design life. Due to the varying radial spans between the support ring and winding, different lengths of the flexible lead connectors are possible, but they all incorporate the same question mark, sickle shape or other elongated curve with an expanded radius in the central region 430. Increasing the radius of the rounded curve in the central region 430 distributes stress and strain along the curve rather than concentrating the stress and strain in a sharp bend or smaller radius curve.

Figure 5A:
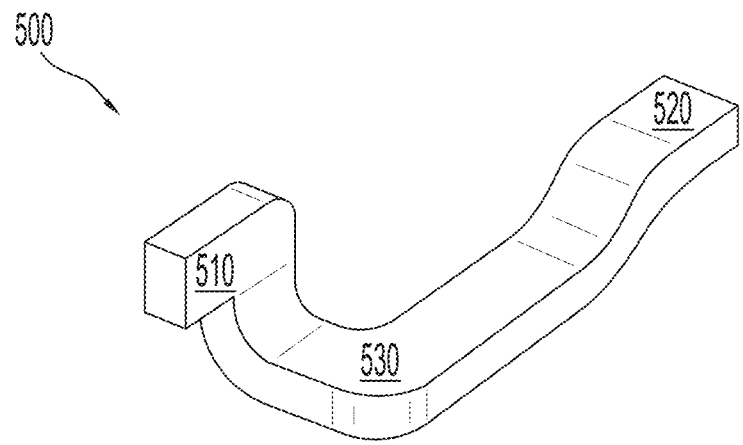
Figure 5B:
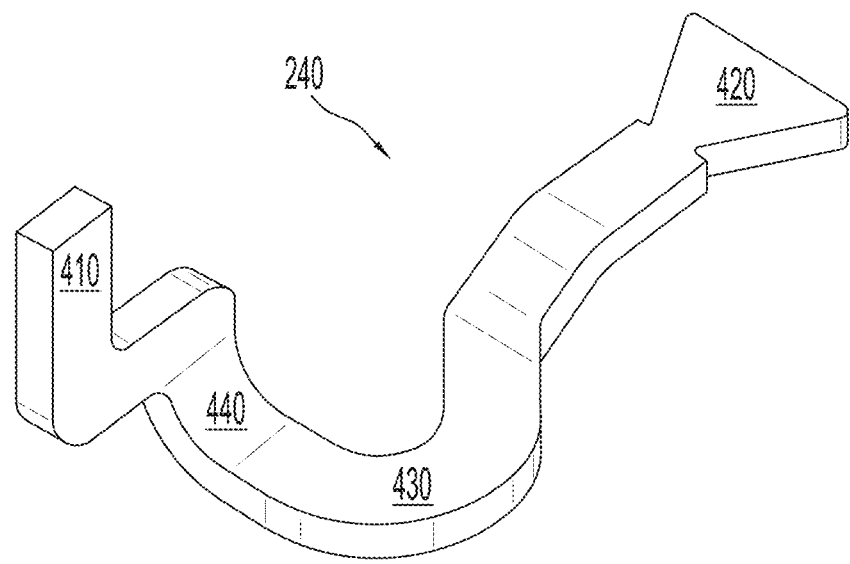
FIG. 5B illustrates a flexible connector according to the present disclosure.

FIG. 5A-5B depict a front perspective view of a prior art connector 500 and the flexible lead connector 240, respectively. The prior art connector 500 shown in FIG. 5A has a first end 510, a second end 520, and a midsection 530, corresponding to the first end 410, second end 420, and midsection 430 of the flexible lead connector 240, respectively. The elongation and widened radius of the flexible lead connector 240 is shown by comparison of the midsection 430 of the flexible lead connector 240 to the midsection 530 of the prior art lead connector 500. The improvement to the second end 420 of the flexible lead connector 240 is also shown by comparison to the second end 520 of the prior art connector 500. The second end 420 is shown in a preferred embodiment in the shape of a dovetail to form a dovetail joint with the wye ring 300. In a preferred embodiment, the dovetail joint between the flexible lead connector 240 and the wye ring 300 is brazed or connected via a nut and bolt attachment after the second end 420 is fit into a corresponding dovetail slot on wye ring 300. By comparison, the second end 520 of the prior art lead connector 500 is affixed to the wye ring 300 by virtue of the lead connector 500 and the wye ring 300 being a single piece of metal. The brazed dovetail joint formed at the second end 420 of the flexible lead connector 240 forms a joint which is stronger than the base metal of the lead connector 240 itself.

Figure 6:
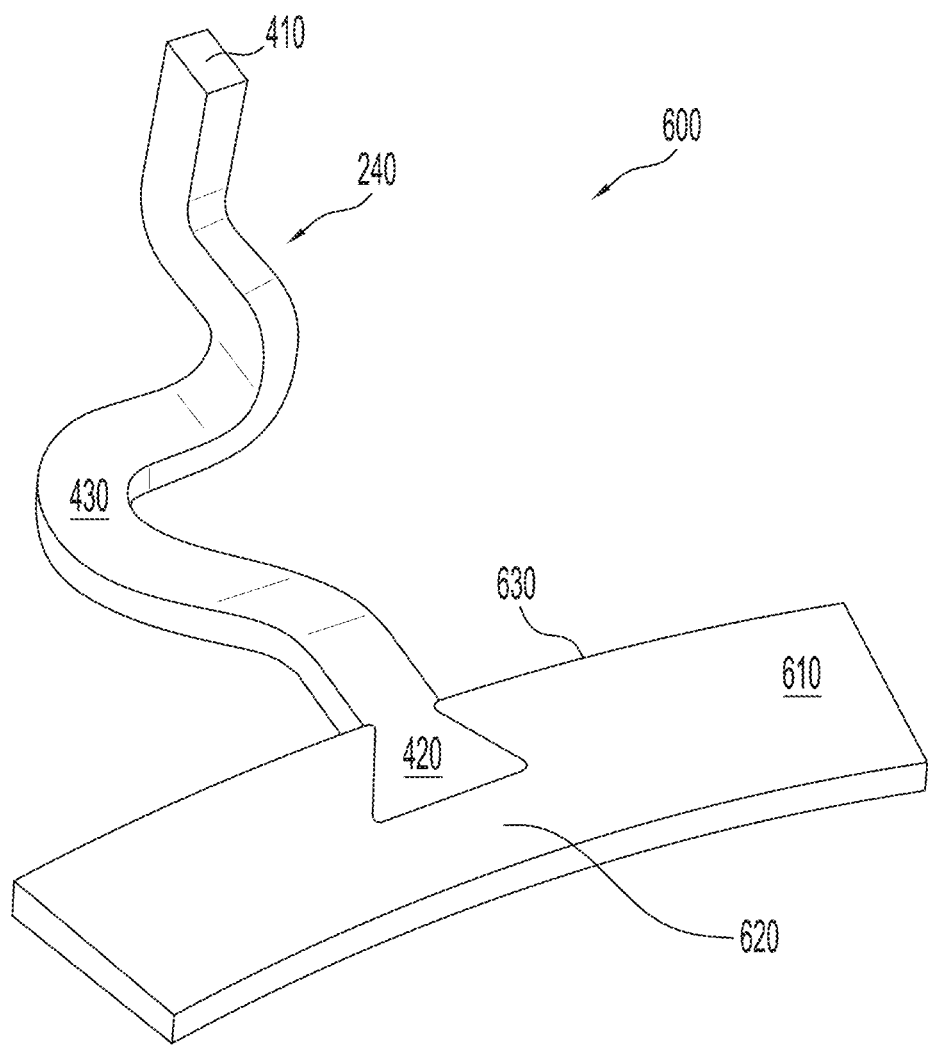
FIG. 6 illustrates a connection joint between the flexible lead connector and a phase ring of the wye ring according to certain aspects of the present disclosure.

FIG. 6 depicts a connection joint 600 between the flexible lead connector 240 and a phase ring 610 of the wye ring 300. The second end 420 of the flexible lead connector 240 is shaped to fit into a slot 620 along an outer rim 630 of the phase ring 610 such that the flexible lead connector 240 extends outwardly in a radial direction from the phase ring 610. The second end 420 of the flexible lead connector 240 and the slot 620 form a dovetail, puzzle, or lap joint. According to aspects, the dovetail, puzzle, or lap joint is brazed or connected via a nut and bolt attachment after the second end 420 is set into the slot 620. According to preferred aspects, the second end 420 and the slot 620 form a brazed dovetail joint connection.

Figure 7A:
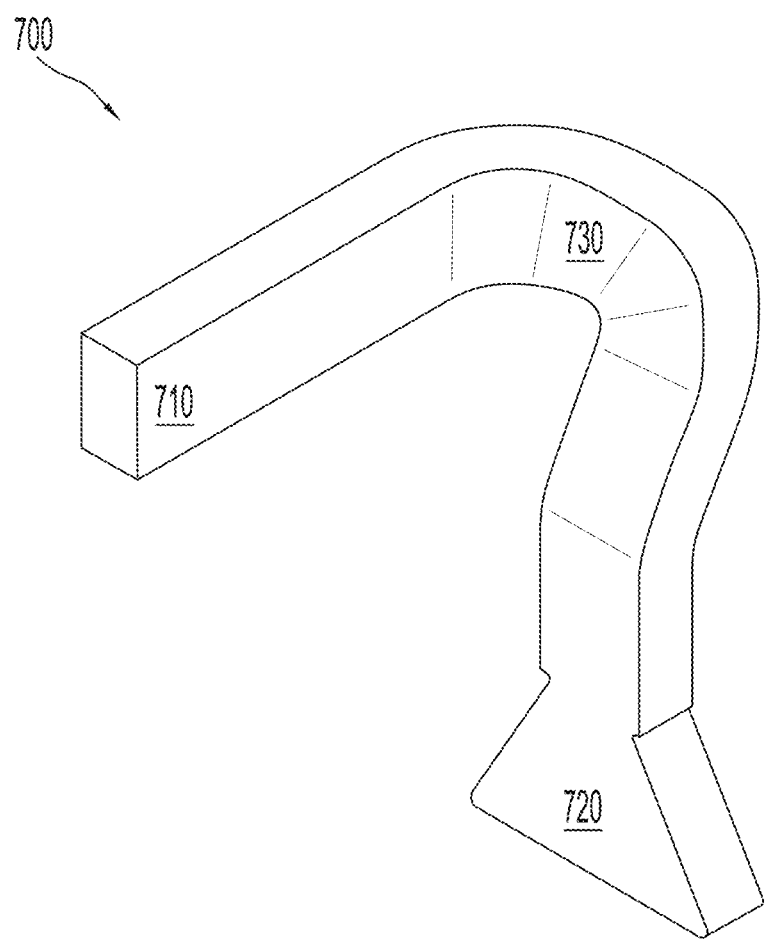
FIGS. 7A-7B illustrate a front perspective view and a front view, respectively, of a jumper according to certain aspects of the present disclosure.
Figure 7B:
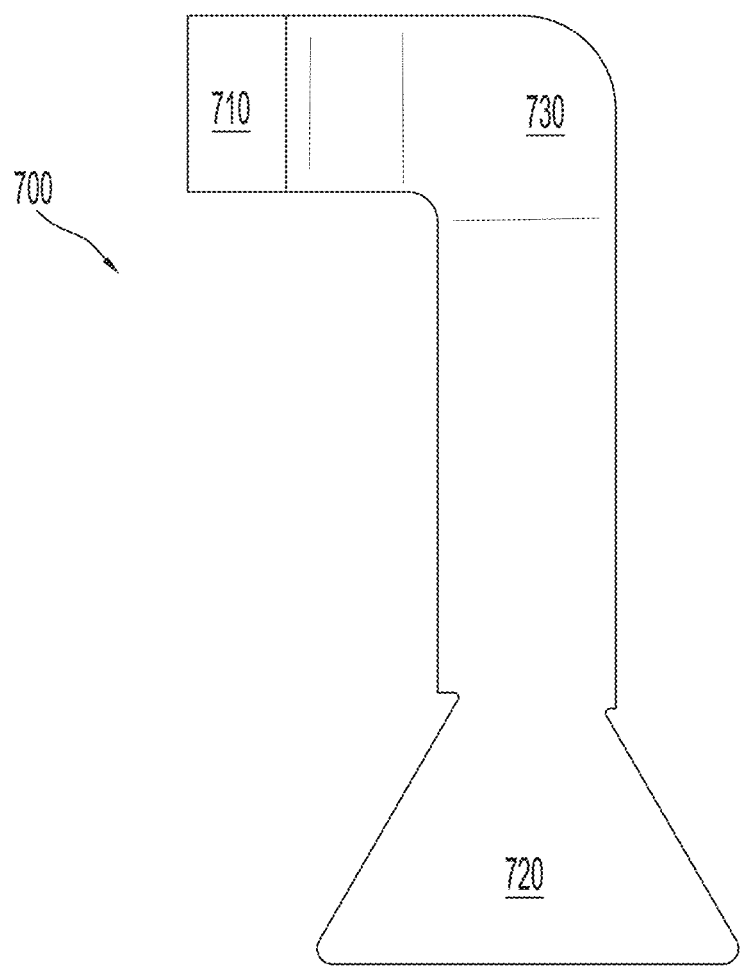

FIG. 7A-7B depicts a jumper 700. The jumper 700 is made from a solid bar of conductive metal like the flexible lead connector 240 delimited by a first end 710 and a second end 720 and having a curved midsection 730. As with the flexible lead connector 240 in FIG. 6, the second end 720 of the jumper 700 is shaped to fit into a slot 620 of the same shape along the outer rim 630 of the phase ring 610. The second end 720 and the slot 620 form a dovetail, puzzle, or lap joint and according to aspects, the joint is brazed or connected via a nut and bolt attachment after the second end 720 is fit into the slot 620. According to preferred aspects, the second end 720 and the slot 620 form a brazed dovetail joint connection. The jumper 700 extends outwardly in an axial direction from the phase ring 610. The midsection 730 of the jumper is curved to align the first end 710 of the jumper with the field winding 230. The first end 710 of the jumper is connected to a second end of the field winding 230, completing a circuit through the field winding 230 and the flexible lead connector 240 from one phase ring 610 to another. The jumper 700 is also depicted in FIGS. 3A-3B attached to the phase ring 610 of the wye ring 300.

Figure 8A:
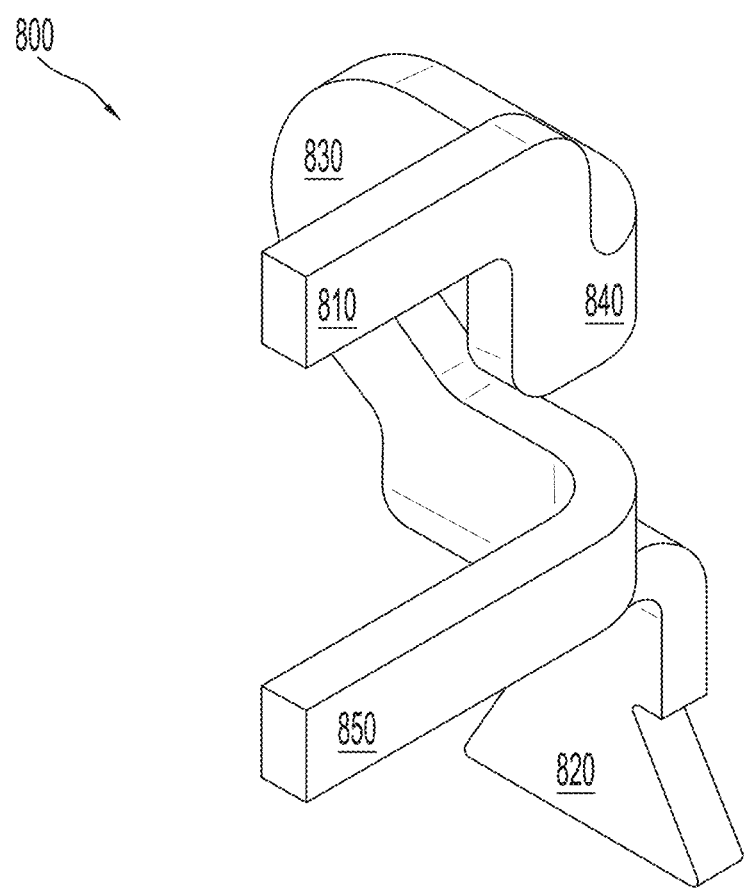
FIGS. 8A-8C illustrate a front perspective view, a front view, and a sideview, respectively, of a flexible neutral connector, according to certain aspects of the present disclosure.
Figure 8B:
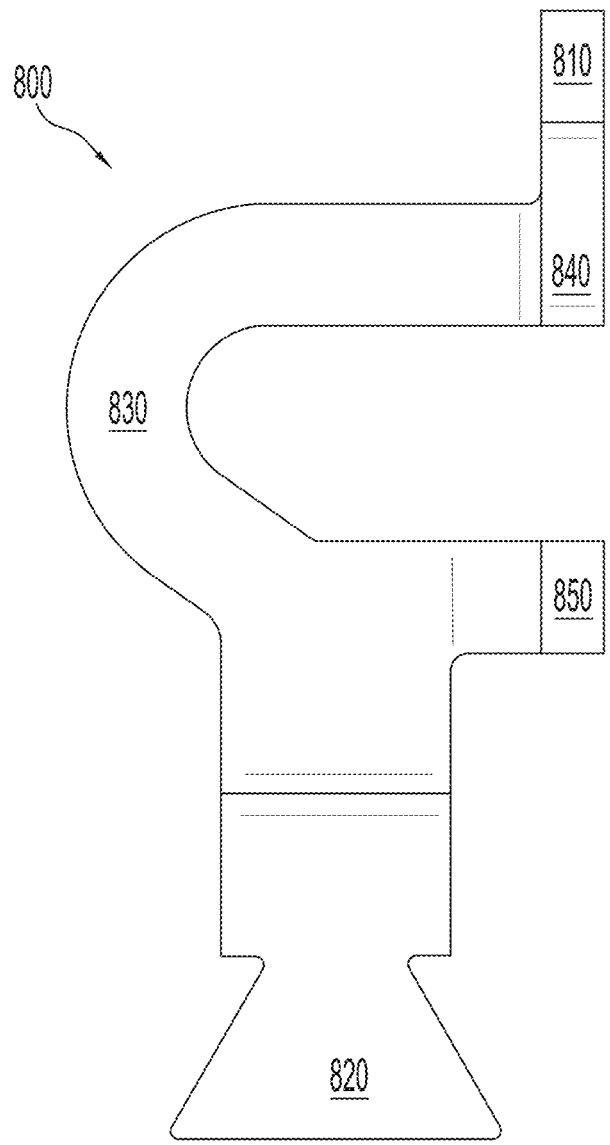
Figure 8C:
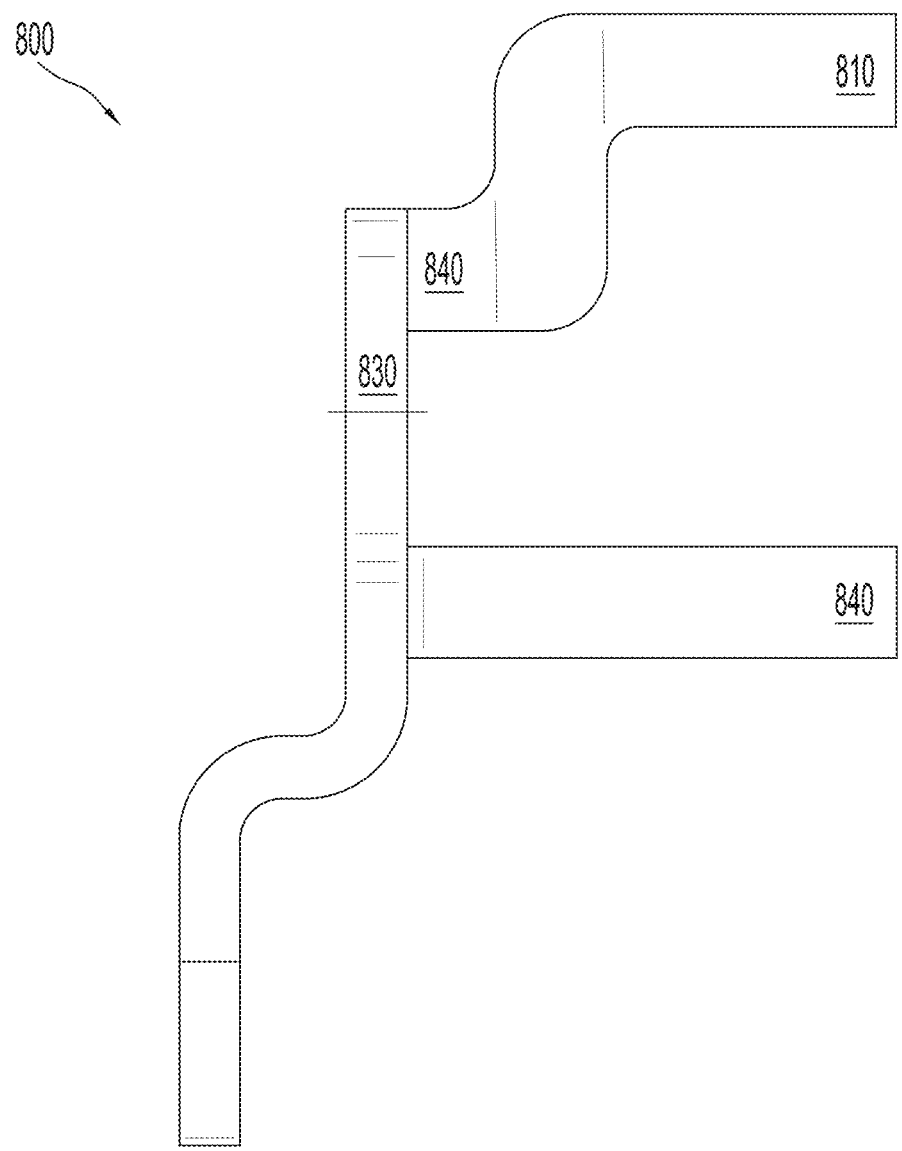

FIGS. 8A-8C depict a flexible neutral connector 800. As with the flexible lead connector 240, the flexible neutral connector 800 is made from a solid bar of conductive metal, such as copper, and is delimited by a first end 810 and a second end 820 and has an elongated curved midsection 830 with an enlarged radius. The elongated curved midsection 830 with an enlarged radius distributes stress and strain across the curved midsection 830 and allows the neutral connector 810 to flex to better accommodate the radial movement of the coils at different speeds and increase lifespan and durability as with the flexible lead connector 240. According to aspects, the neutral connector 800 may comprise one or more additional curves 840 to align the first end 810 of the neutral connector 800 with the field winding 230. The first end 810 is attached to the field winding 230 in the same manner as the flexible lead connector 240 and jumper 700, which may include a brazed connection, attachment to an attachment lug, or connection via a nut and bolt attachment. According to aspects, the neutral connector 800 comprises a prong 850 protruding from below the midsection 830, which may be attached to the field winding 230 in the same manner. The second end 820 of the neutral connector 800 is connected to the neutral ring 220 in the same manner as the flexible lead connector 240, as depicted in FIG. 6, such that the neutral connector 800 extends radially from the neutral ring 220. The second end 820 of the neutral connector 800 is shaped to fit into a slot with the same shape, as is depicted by slot 620 in FIG. 6. The connection between the second end 820 of the neutral connector 800 and the neutral ring 220 may form a dovetail, puzzle or lap joint and according to aspects is brazed or connected via a nut and bolt attachment. According to preferred aspects, the connection forms a brazed dovetail connection.

The inventive connection system disclosed herein comprising a flexible lead connector 240, a jumper 700, and flexible neutral connector 800 connecting the field windings 230 and the wye ring 300 ameliorates the failure modes noted above of the prior art systems. The elongated curved midsection and brazed or bolted puzzle joint of the flexible lead connector 240 and the flexible neutral connector 800 disclosed herein provide a significant improvement over the prior art one piece or brazed straight-line connectors. Under the centrifugal stresses that induce dilation of the banding and thermal expansion of the winding, the increase in flexibility of the connectors and improved structural integrity of their connection to the wye ring greatly reduces overall wear on the components and the risk for mechanical failure. The curved flexible lead connector 240 and flexible neutral connector 800 provide the flexibility to withstand the centrifugal stresses while providing the mechanical strength required to maintain proper positioning and connection of the components.

Design Concept—Wye Ring

Disclosed herein is a unique design for retrofitting rotating electric machines that utilize many of the same individual components. Each design may be applicable to all DFIGs and may be adapted on a case-by-case basis to specific generator models.

Figure 9:
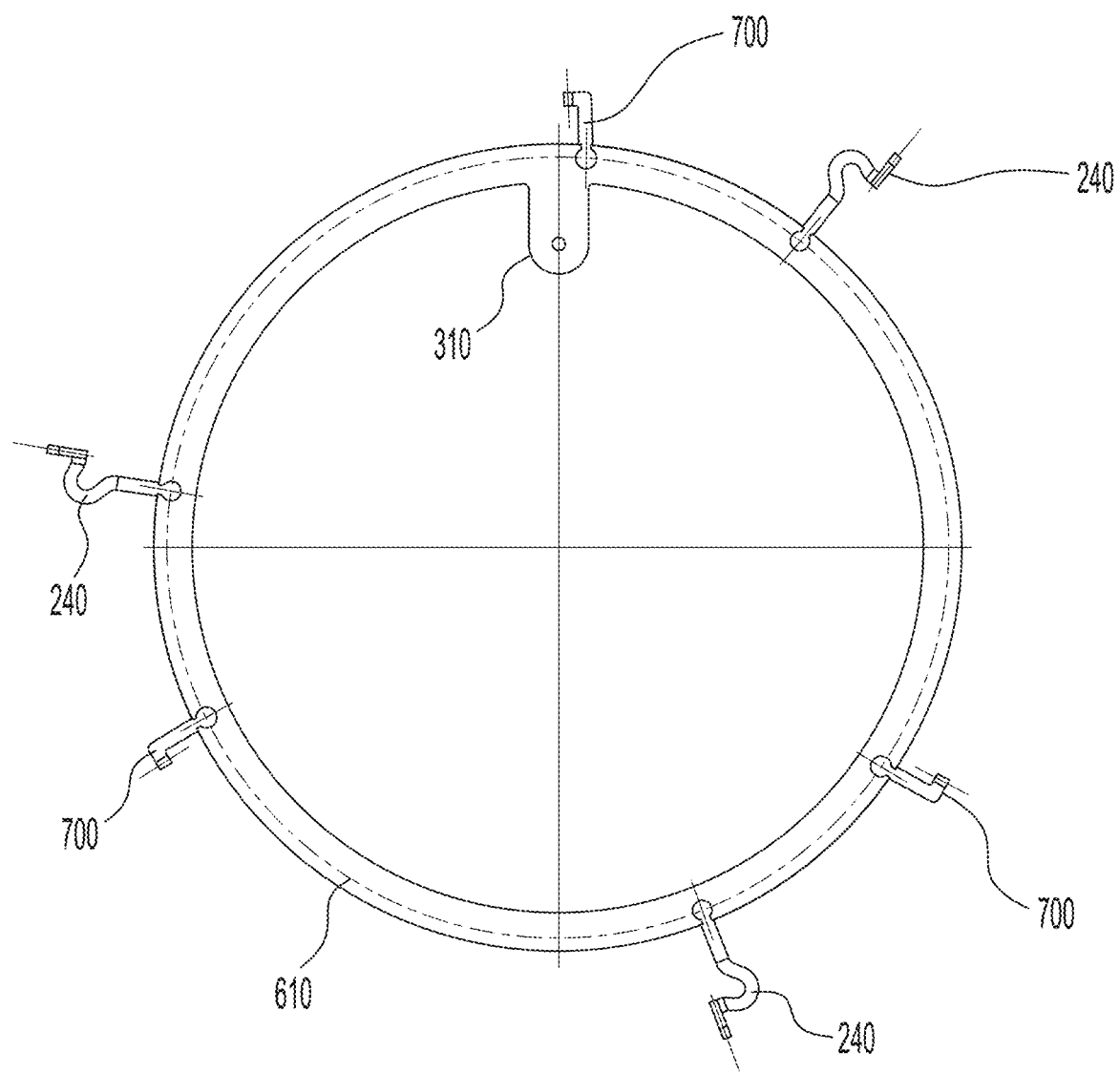
FIG. 9 illustrates a front perspective view of a phase ring with three flexible lead connectors and three jumpers connected to the outer rim extending in a radial direction according to certain aspects of the present disclosure.

FIG. 9 depicts an exemplary phase ring 610 with three flexible lead connectors 240 and three jumpers 700 connected to the outer rim 630 extending in a radial direction. The flexible lead connectors 240 and the jumpers 700 are connected in the manner described above and depicted in FIG. 6. Each of the three flexible lead connectors 240 are equidistantly spaced every 120 degrees around the phase ring 610. Similarly, each of the three jumpers 700 are equidistantly spaced from each other every 120 degrees around the phase ring 610. According to certain aspects, each jumper 700 may be spaced 40 degrees from the closest flexible connector 240. The phase ring 610 further comprises a main lead connector 310 extending radially inward. The main lead connector 310 provides connection points for the electrical leads that extend from the central rotor shaft (210 of FIG. 2). While a specific arrangement of flexible lead connectors 240 and the jumpers 700 is depicted with respect to the main lead connector 310, that arrangement may be altered in additional phase rings (i.e., relative positions of the flexible lead connectors 240 and the jumpers 700 with respect to the main lead connector 310) to achieve the arrangement shown in FIG. 3B.

Figure 10:
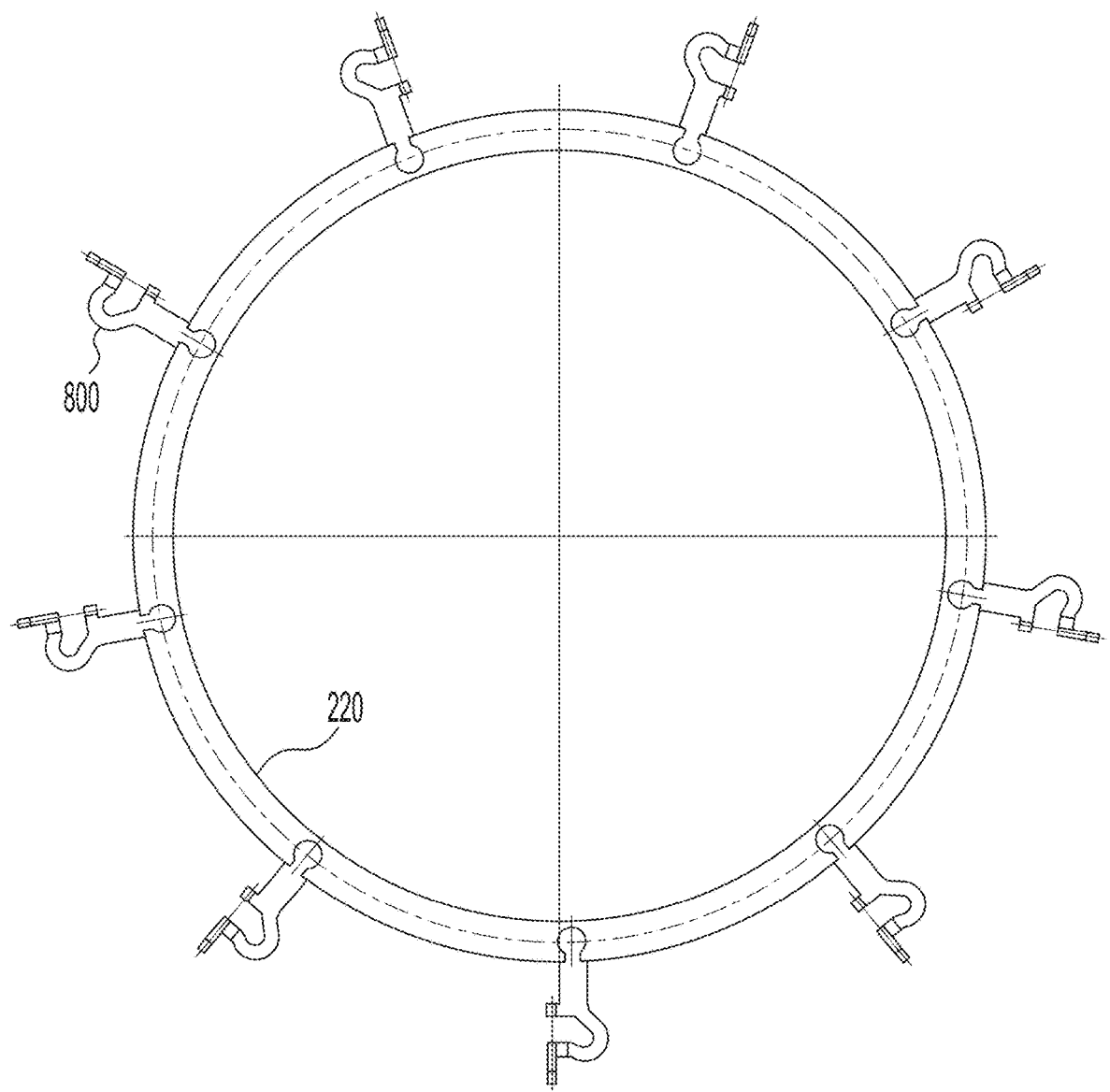
FIG. 10 illustrates the neutral ring with nine flexible neutral connectors connected to the outer rim extending in a radial direction according to certain aspects of the present disclosure.

FIG. 10 depicts the neutral ring 220 with nine flexible neutral connectors 800 connected to the outer rim extending in a radial direction. The flexible neutral connectors 800 are connected in the manner described above and depicted in FIG. 6. Each of the nine flexible neutral connectors 800 are equidistantly spaced every 40 degrees around the neutral ring 220.

The wye ring 300, depicted in FIG. 3B, comprises three phase rings 610, as depicted in FIG. 9, stacked in an axial direction. The phase rings 610 are stacked such that the flexible lead connectors 240 are equidistantly spaced every 40 degrees from each other. The main lead connectors 310 are equidistantly spaced every 120 degrees from each other. The wye ring 300 further comprises the neutral ring 220 stacked in an axial direction, with each neutral connector 800 extending radially at the midpoint between every two flexible lead connectors 240, at 20 degrees from each flexible lead connector 240.

Figure 11:
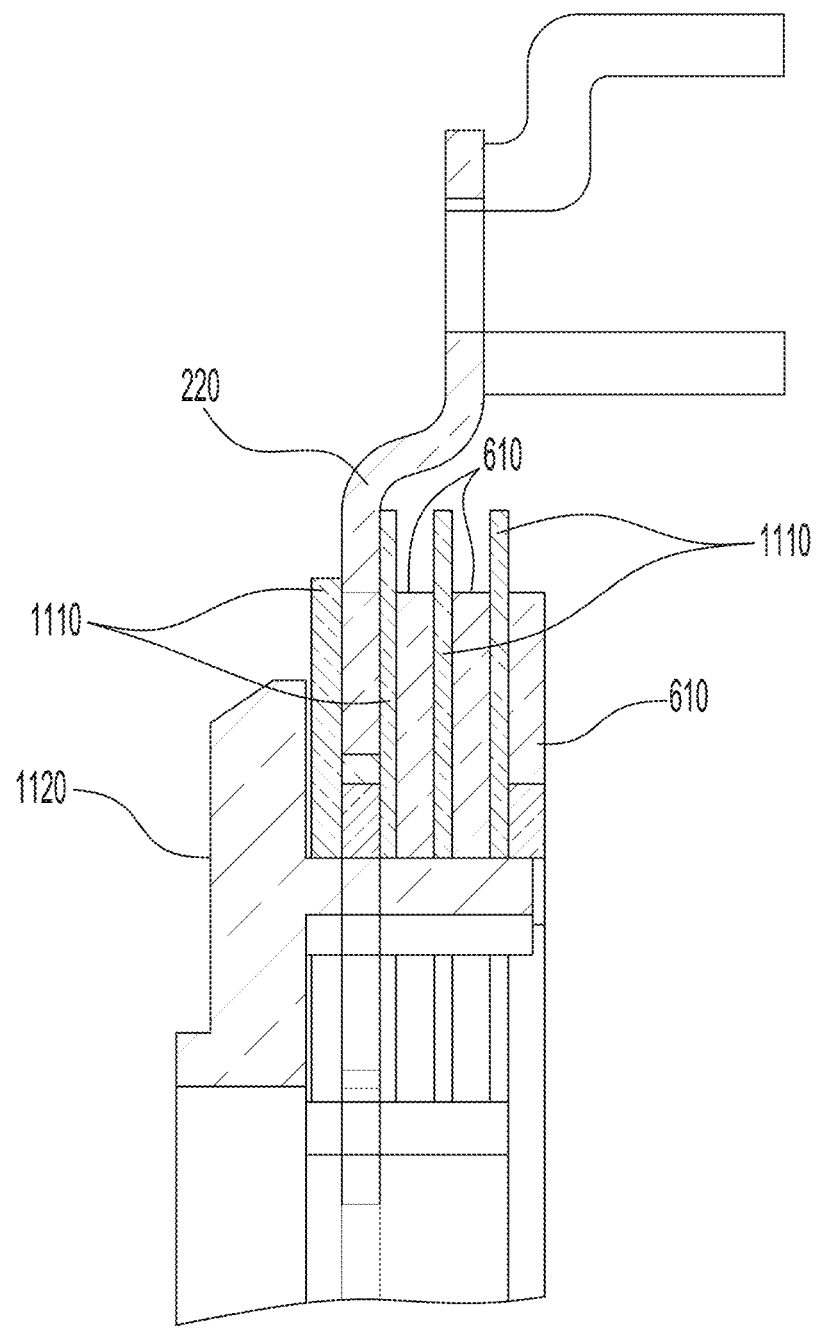
FIG. 11 illustrates a cross sectional view taken along line C-C of FIG. 3B showing a wye ring having a flexible neutral connector connected therein according to certain aspects of the present disclosure.

FIG. 11 depicts a cross section 1100 of a wye ring 300. Three phase rings 610 are stacked axially with one neutral ring 220 and a mounting ring 1120. An insulator ring 1110 made out of an electrically insulating material is axially layered between each ring 610, 220, 1120. The phase rings 610, neutral ring 220, and insulator rings 1110 are supported by and attached to the mounting ring 1120. The mounting ring 1120 may be shrunk fit or bolted to the rotor shaft 12.

Examples

The present inventors evaluated the design of current phase and neutral connections using geometry taken directly from the wye ring and an accompanying solid model to better understand the resulting failure modes observed in the field and design improved wye rings and connectors. The analysis used classical analytical calculations, mathematical analysis, and 3D modeling in order to determine the cause of the cracking and to provide a design that is more resistant to the cyclic stresses and strains inevitable in the operation of generators. Where necessary, assumptions were conservative given the critical nature of the components of interest.

The copper wye ring serves as the internal three-phase connection that links the coil groups together in the rotor. However, the wye ring commonly experiences fatigue cracking in the phase and neutral lead connections. The root cause of these failures is the different centrifugal expansion and contraction of the end winding and banding relative to the wye rings which eventually leads to the connections cracking and separating at areas where stress concentration occurs. These wye ring phase and neutral lead connections must also be able to withstand the forces applied due to normal operation as well as overspeed. In order to ensure the validity of the inventive design, the analysis of the original design was done as baseline and a starting point for the new design.

Using the geometry for the prior art connector, i.e., as shown in FIG. 5A, and known material properties of annealed copper, operating displacements were calculated for the connector during operation of the machine and applied as loads in the mathematical and 3D models in order to calculate operating stresses and strains.

As seen in the stress results listed in Table 1, as the unit reaches operating speed, the stress in the connectors reaches a point past yield of the material, and stress redistributes due to ductility. However, this strain in the material causes fatigue damage in the critical radius and eventually, cracking and separation.

Similar analysis and modeling was performed for a connector as shown in FIG. 5B according to the present disclosure (see Table 1). The new design successfully converges in the 2× operating speed case, thus proving that the inventive connector can withstand the forces due to rotational velocity up to 2680 rpm.

TABLE 1

|  | Average Von Mises Stress (psi) | Local Peak Stress (psi) | Average Equivalent Strain (in/in) | Local Peak Strain (in/in) |
|---|---|---|---|---|
| Critical Radius Prior art | 27661 | 32471 | 0.0017 | 0.0019 |
| Critical Radius Inventive | 34416 | 27567 | 0.0014 | 0.0016 |

The braised dovetail connection between the connector design and parallel ring, as shown in FIG. 6, was also modeled and analyzed for structural analysis. The mathematical analysis model found the stresses near the braised connection to be lower than the critical area of the radius in the lead connector, and thus the braised dovetail connection was verified.

The approach used to analyze the fatigue life of both designs was a strain-life method, which can characterize the fatigue life of materials involving high stresses and stress concentrations where significant plasticity are involved. Using the Coffin-Manson relationship described in "Metal Fatigue in Engineering" (Stephens, Fatemi, Stephens, Fuchs, c1980.), the present inventors characterized the strain-life equation for annealed copper using extrapolated fatigue properties of the material from known fatigue strength exponents, b, and fatigue ductility exponents, c, from similar materials, specifically, experimental data from oxygen-free annealed copper material where b=−0.12, and c=−0.6. True fatigue life results will differ due to differences in craftsmanship, material impurities, and other factors. However, due to the conservative driving calculations, true strain on the new design connectors will be lower than reported, thus the true fatigue life will skew higher than reported.

The strain-life equation and the maximum peak strain in the critical radius was used to determine the number of cycles to failure. Table 2 below shows the results of the Coffin-Manson Strain-Life equation using the aforementioned strain results. Failure in this analysis is defined as crack initiation.

TABLE 2

|  | Maximum Peak Strain at radius (in/in) | Number of Cycles to Failure | % Improvement |
|---|---|---|---|
| Prior Art | 0.0019 | 45925 |  |
| Inventive | 0.0016 | 68232 | +48.6% |

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications may be made without departing from the spirit and scope of the invention. Those skilled in the art will recognize or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. A system for replacement of electrical connections in a rotating electric machine, the system comprising:
a wye ring positionable radially inside of a field winding of the rotating electric machine; and
a plurality of flexible connectors configured to electrically couple the wye ring to the field winding,
wherein each of the plurality of flexible connectors comprise a metal bar delimited by a first end and a second end, the first end being connectable to the field winding and the second end being connected to the wye ring,
wherein the wye ring comprises three phase rings and one neutral ring,
wherein the plurality of flexible connectors comprises a plurality of flexible neutral connectors that are connected to the neutral ring at equally spaced intervals, wherein each of the plurality of flexible neutral connectors have an elongated curved midsection to provide flexibility in the radial direction, and further comprise a lower arm positioned beneath the midsection but separated from the second end.

2. The system of claim 1, wherein the flexible connector is connected to the wye ring by a puzzle joint, wherein the puzzle joint is a dovetail joint.

3. The system of claim 1, wherein the flexible connector is connected to the wye ring by a puzzle joint, wherein the puzzle joint is a lap joint.

4. The system of claim 1, wherein the flexible connector is connected to the wye ring by a puzzle joint, wherein the puzzle joint is brazed.

5. The system of claim 1, wherein the flexible connector is connected to the wye ring by a puzzle joint, wherein the puzzle joint is bolted.

6. The system of claim 1, wherein each of the plurality of flexible connectors are sickle or question mark shaped.

7. The system of claim 1, wherein the plurality of flexible neutral connectors comprises nine flexible neutral connectors that are connected to the neutral ring at equally spaced intervals.

8. The system of claim 1, wherein each of the three phase rings comprises three flexible connectors attached thereto at equally spaced intervals.

9. The system of claim 8, wherein each of the three flexible connectors comprise a flexible lead connector.

10. The rotating electric machine of claim 1, wherein the three phase rings are axially layered such that each flexible connector is equally spaced around a circumference of the three phase rings.

11. The rotating electric machine of claim 10, wherein the three phase rings are axially layered with the neutral ring with an insulating layer between each ring.

12. The rotating electric machine of claim 11, wherein the three phase rings and the neutral ring are supported by a mounting ring.

13. The rotating electric machine of claim 1, wherein a jumper is attached to each of the three phase rings.

14. A method of replacing a wye ring in a rotating electric machine comprising:
providing the system of claim 1; and
mounting the system provided in claim 1 to an axle of the rotating electric machine.

15. A system for connection between a winding and a wye ring of a rotating electric machine, wherein the wye ring is spaced apart from a central rotor shaft of the rotating electric machine and the winding is spaced apart from the wye ring, the system comprising:
a plurality of flexible lead connectors having a longitudinal extent delimited by a first end portion and a second end portion and comprising an elongated curved midsection to provide flexibility in the radial direction; and
a plurality of flexible neutral connectors having a longitudinal extent delimited by a first end portion and a second end portion and comprising an elongated curved midsection to provide flexibility in the radial direction, and a lower arm positioned beneath the midsection but separated from the second end thereof,
wherein the first end portion of each of the flexible lead connectors and the flexible neutral connectors is configured for connection to the winding and the second end portion of each of the flexible lead connectors and the flexible neutral connectors is configured for connection to the wye ring,
wherein the second end portion of each of the flexible lead connectors and the flexible neutral connectors is connected to the wye ring by a puzzle joint.

16. The system of claim 15, wherein the elongated curved midsection of each of the flexible lead connectors and the flexible neutral connectors resembles a sickle or question mark.

17. The system of claim 15, wherein the puzzle joint is a dovetail joint or lap joint.

18. The system of claim 15, wherein the puzzle joint is brazed or bolted.

19. A system for replacement of electrical connections in a rotating electric machine, the system comprising:
a wye ring positionable radially inside of a field winding of the rotating electric machine; and
a plurality of flexible connectors configured to electrically couple the wye ring to the field winding,
wherein each of the plurality of flexible connectors comprise a metal bar delimited by a first end and a second end, and having an elongated curved midsection to provide flexibility in the radial direction, wherein the first end is connected to the field winding and the second end is connected to the wye ring,
wherein the wye ring comprises three phase rings and one neutral ring,
wherein the plurality of flexible connectors comprises a plurality of flexible neutral connectors that are connected to the neutral ring at equally spaced intervals and three flexible leads connectors connected to each of the three phase rings.

20. The system of claim 19, wherein the plurality of flexible neutral connectors comprises nine flexible neutral connectors that are connected to the neutral ring at equally spaced intervals.

21. The system of claim 19, wherein each of the plurality of flexible neutral connectors have an elongated curved midsection to provide flexibility in the radial direction, and further comprise a lower arm positioned beneath the midsection but separated from the second end.

* * * * *